United States Patent
Mashkevich

[11] Patent Number: 5,947,554
[45] Date of Patent: Sep. 7, 1999

[54] SEAT ASSEMBLY WITH CENTER ADJUSTABLE HEIGHT ARMREST

[75] Inventor: Stan Mashkevich, West Bloomfield, Mich.

[73] Assignee: Chrysler Corporation, Auburn Hills, Mich.

[21] Appl. No.: 08/992,349

[22] Filed: Dec. 17, 1997

[51] Int. Cl.[6] .................................................. A47C 13/00
[52] U.S. Cl. .............. 297/115; 297/188.14; 297/216.13; 297/411.36
[58] Field of Search ................................ 297/115, 188.01, 297/188.14, 248, 411.3, 411.2, 411.35, 411.36, 411.39, 112, 113, 378.1, 378.11, 216.1, 216.13, 216.14, 411.38

[56] References Cited

U.S. PATENT DOCUMENTS

| | | | |
|---|---|---|---|
| 4,176,878 | 12/1979 | Koutsky | 297/115 |
| 5,150,946 | 9/1992 | Marfilius et al. | 297/113 X |
| 5,433,503 | 7/1995 | DeFilippo | 297/115 |
| 5,658,043 | 8/1997 | Davidson | 297/216.1 X |
| 5,676,421 | 10/1997 | Brodsky | 297/216.13 |
| 5,685,612 | 11/1997 | MacDonald et al. | 297/378.1 |
| 5,752,739 | 5/1998 | Saeki | 297/113 |
| 5,788,324 | 8/1998 | Shea et al. | 297/113 |

*Primary Examiner*—Milton Nelson, Jr
*Attorney, Agent, or Firm*—William J. Coughlin

[57] ABSTRACT

A seat assembly with a center adjustable height armrest includes a generally horizontal seat portion and a generally upright back portion. The back portion has a pair of outer seat backs spaced transversely and a center seat back disposed between the outer seat backs aligned in a row. The center seat back has an upright position aligned with the outer seat backs and a folded down position at an angle to the outer seat backs. The folded center seat back provides an armrest having an adjustable height of either one of a load floor height and an ergonomic armrest height.

16 Claims, 4 Drawing Sheets

SEAT ASSEMBLY WITH CENTER ADJUSTABLE HEIGHT ARMREST

BACKGROUND OF THE INVENTION

1. Field of the Invention

The present invention relates generally to seats in motor vehicles and, more particularly, to a seat assembly with a center adjustable height armrest in a motor vehicle.

2. Description of Related Art

Motor vehicles, especially automotive vehicles, may have a second row seat assembly or even a third row seat assembly. Generally, the second row seat assembly has a 40/20/40 cushion or seat portion and a 40/20/40 back portion. The back portion may include a center armrest. The 40/20/40 back portion folds as an integral unit into a load floor and the forty percent (40%) sections or seat backs may tumble to allow third row ingress and egress. An example of a 40/20/40 seat assembly is disclosed in commonly assigned pending U.S. patent application Ser. No. 08/859,306, filed May 20, 1997, entitled "Seat Assembly with Center Fold-Out Armrest".

One disadvantage of the above second row seat assembly is that the center seat back in a folded position is not ergonomically positioned for an occupant of an outboard seat to comfortably rest an arm. Therefore, there is a need in the art to provide a center seat back for a seat back portion of a seat assembly that has an ergonomic height or a load floor height in a folded position.

SUMMARY OF THE INVENTION

It is, therefore, one object of the present invention to provide a seat assembly with a center seat back.

It is another object of the present invention to provide a center seat back that folds down for a seat assembly in a motor vehicle.

It is yet another object of the present invention to provide a seat assembly with a center adjustable height armrest being ergonomic for a motor vehicle.

It is still yet another object of the present invention to provide a folded center seat back having a load floor height for a seat assembly in a motor vehicle.

It is a further object of the present invention to provide height selector mechanism for selecting the ergonomic armrest height or the load floor height for a seat assembly in a motor vehicle.

To achieve the foregoing objects, the present invention is a seat assembly with a center adjustable height armrest including a generally horizontal seat portion and a generally upright back portion. The back portion has a pair of outer seat backs spaced transversely and a center seat back disposed between the outer seat backs aligned in a row. The center seat back has an upright position aligned with the outer seat backs and a folded down position at an angle to the outer seat backs. The folded center seat back provides an armrest having an adjustable height of either one of a load floor height or an ergonomic armrest height.

One advantage of the present invention is that a seat assembly is provided with center seat back that folds down. Another advantage of the present invention is that a seat assembly is provided with a 40/20/40 second row seat that provides a center armrest from a folded down twenty percent (20%) center seat back for an outer seat occupant. Yet another advantage of the present invention is that the folded center seat back has a vertical height that is ergonomically positioned for supporting an arm of the outer seat occupant. Still another advantage of the present invention is that the folded center seat back has a verticle height that provides a planar load floor. A further advantage of the present invention is that a height selector mechanism operably connected to a pivoting mechanism is provided for selecting a center pivot point of the center seat back that geometrically determines the folded center seat back height.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
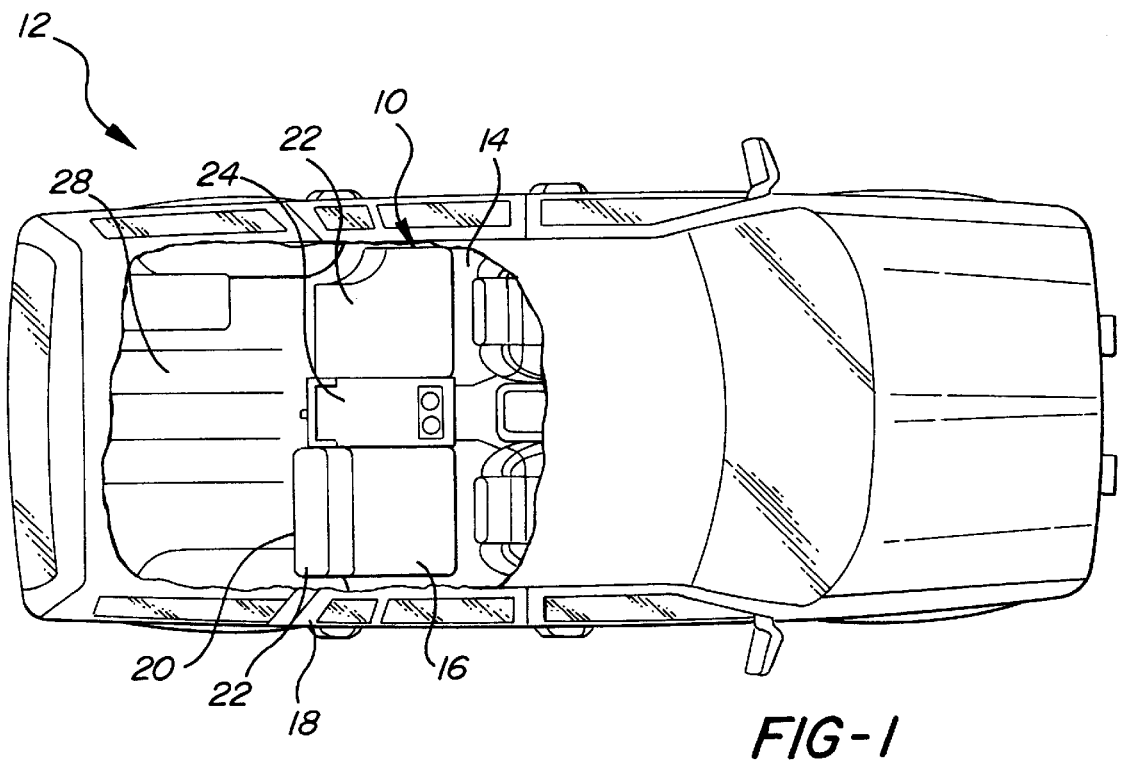
FIG. 1 is a top view of a seat assembly with a center adjustable height armrest, according to the present invention, illustrated in operational relationship with a motor vehicle.

Referring to FIG. 1, a seat assembly 10, according to the present invention, is illustrated in operational relationship with a motor vehicle, generally indicated at 12, such as an automotive vehicle. The seat assembly 10 is preferably of a second row type, disposed within an occupant compartment 14 of the motor vehicle 12, as is known in the art. The seat assembly 10 has a generally horizontal seat portion 16 connected by suitable means (not shown) to vehicle structure 18 of the motor vehicle 12. It should be appreciated that the seat portion 16 is of a 40/20/40 type and is formed in one or more sections as is known in the art.

The seat assembly 10 also includes a generally vertical or upright back portion 20. It should be appreciated that the back portion 20 is of a 40/20/40 type, corresponding with the seat portion 16, as is known in the art. In a 40/20/40 type seat back, the back portion 20 includes a pair of outer seat backs 22 and a center seat back 24 spaced transversely and aligned in a row.

The outer seat backs 22 are each approximately forty percent (40%) of the back portion 20, and the center seat back 24 is twenty percent (20%) of the back portion. The outer seat backs 22 are pivotally connected by suitable means (not shown) to the seat portion 16. The outer seat backs 22 and center seat back 24 fold into a load floor 28 on the seat portion 16. Preferably, the load floor 28 is of uniform height to facilitate the hauling of a load. The outer seat back 22 may also tumble, as known in the art, to allow third row ingress and egress in the motor vehicle 12.

The center seat back 24 is pivotally connected to the vehicle structure 18 by a pivoting mechanism 40, to be described. The center seat back 24 has an upright position aligned with the outer seat backs 22 and a folded down position at an angle to the outer seat backs 20. In a folded down position, the center seat back 24 may provide an armrest for an outer seat occupant or may be part of the load floor.

Figure 2:
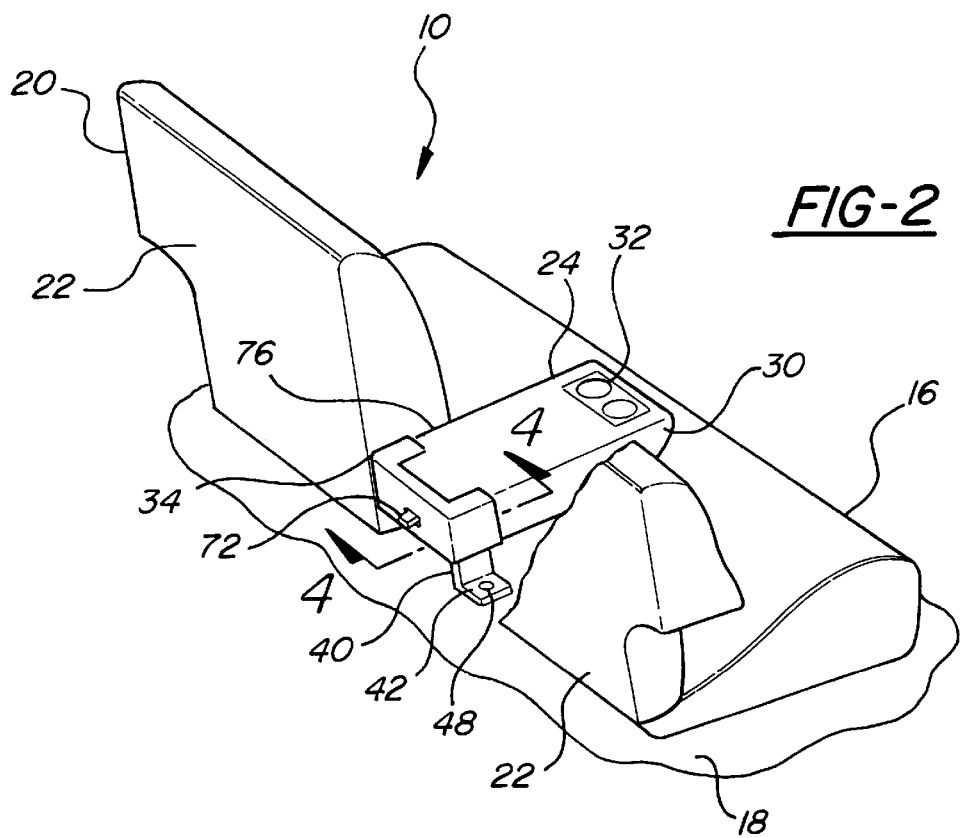
FIG. 2 is a perspective view of the seat assembly of FIG. 1 illustrating a folded center seat back in a load floor height position.
Figure 3:
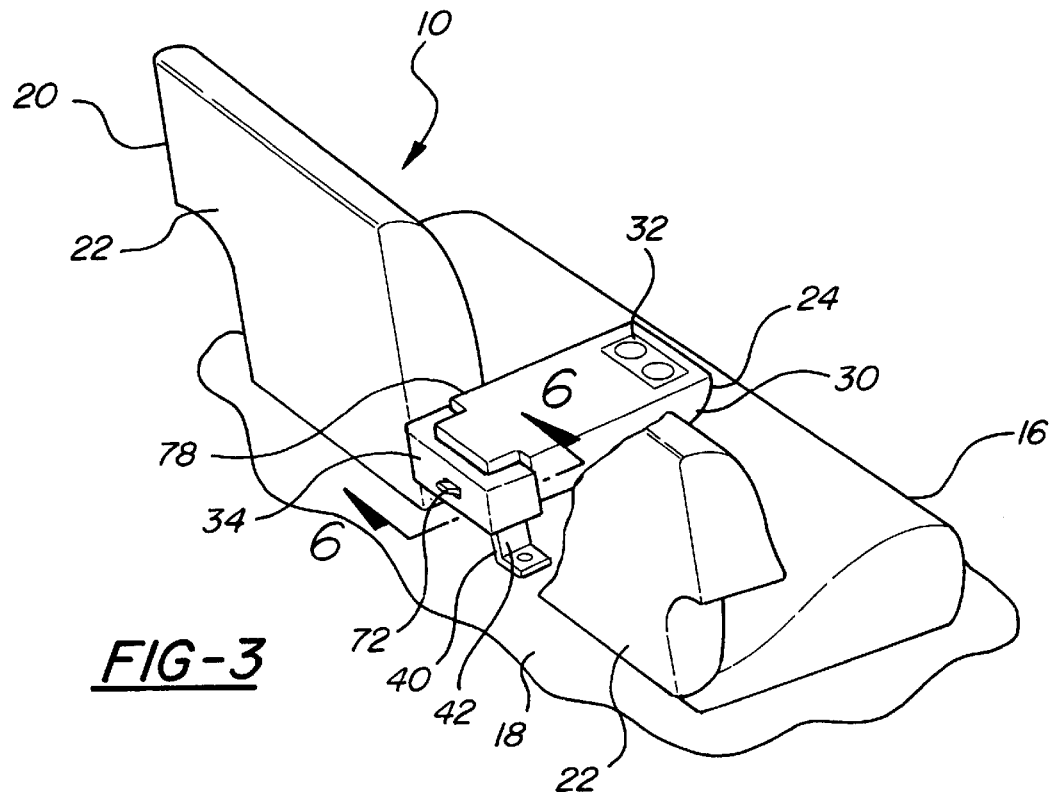
FIG. 3 is a view similar to FIG. 2 illustrating the folded center seat back armrest in an ergonomic armrest position.

Referring to FIGS. 2 and 3, the center seat back 24, in this example, includes a padded portion 30 on a forward side and/or rearward side thereof, and a cover portion 34 covering the pivoting mechanism 40. The padded portion 30 is preferably made of a foam material having a covering on an outer surface such as cloth, leather, vinyl or the like. A rearward side of the center seat back 24 may include at least one, preferably a pair of recesses or cupholders 32 extending forwardly into the padded portion 30. The cover portion 34 is a generally u-shaped member attached to an end of the padded portion 30 to protect the pivoting mechanism 40. Preferably, the cover portion 34 is made of a rigid material such as plastic. It should be appreciated that the center seat back 24 may serve several purposes, for example as a seat back; a load floor; a cupholder; and/or an armrest.

In FIG. 2, the center seat back 24 is illustrated in a folded position. It should be appreciated that the vertical height of the center seat back 24 in this position provides an integral, planar load floor. However, the load floor height 76 may be too low to ergonomically support an arm (not shown) of an outer seat occupant (not shown) sitting in the seat assembly 10.

In FIG. 3, the center seat back 24 is illustrated in an ergonomic position preferred for an armrest to comfortably support the arm of the outer seat occupant. Preferably, the vertical height of the center seat back 24 for an ergonomic armrest height 78 is higher than the load floor height 76, to ergonomically support the arm of the outer seat occupant. Consequently, the ergonomic armrest height 78 will not provide a planar load floor 28 if the seat back portion 20 is folded down into a load floor 28.

Figure 4:
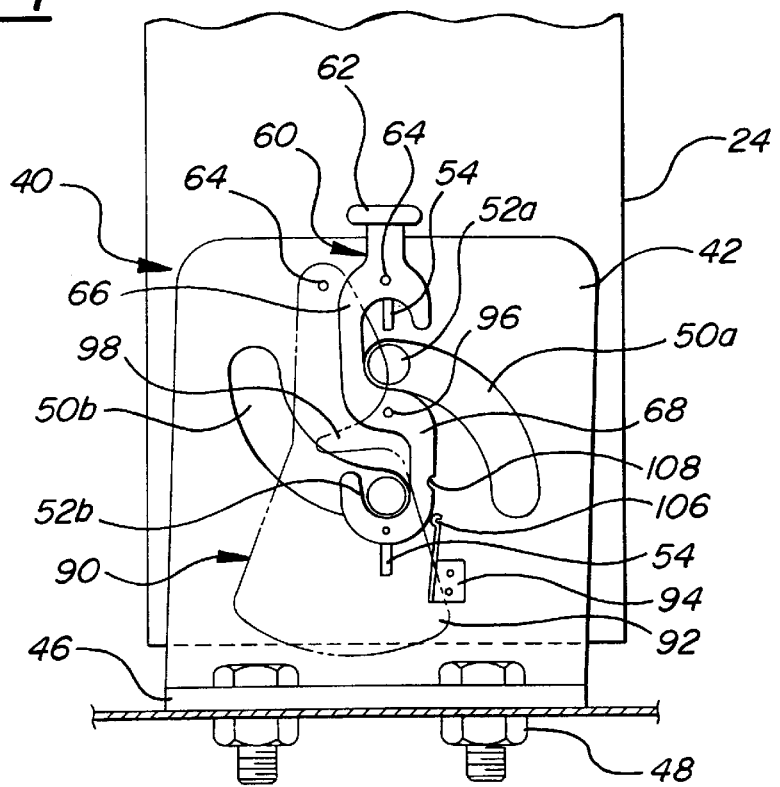
FIG. 4 is a sectional view taken along line 4—4 of FIG. 1 illustrating a pivoting mechanism for the center seat back in an upright position.
Figure 5:
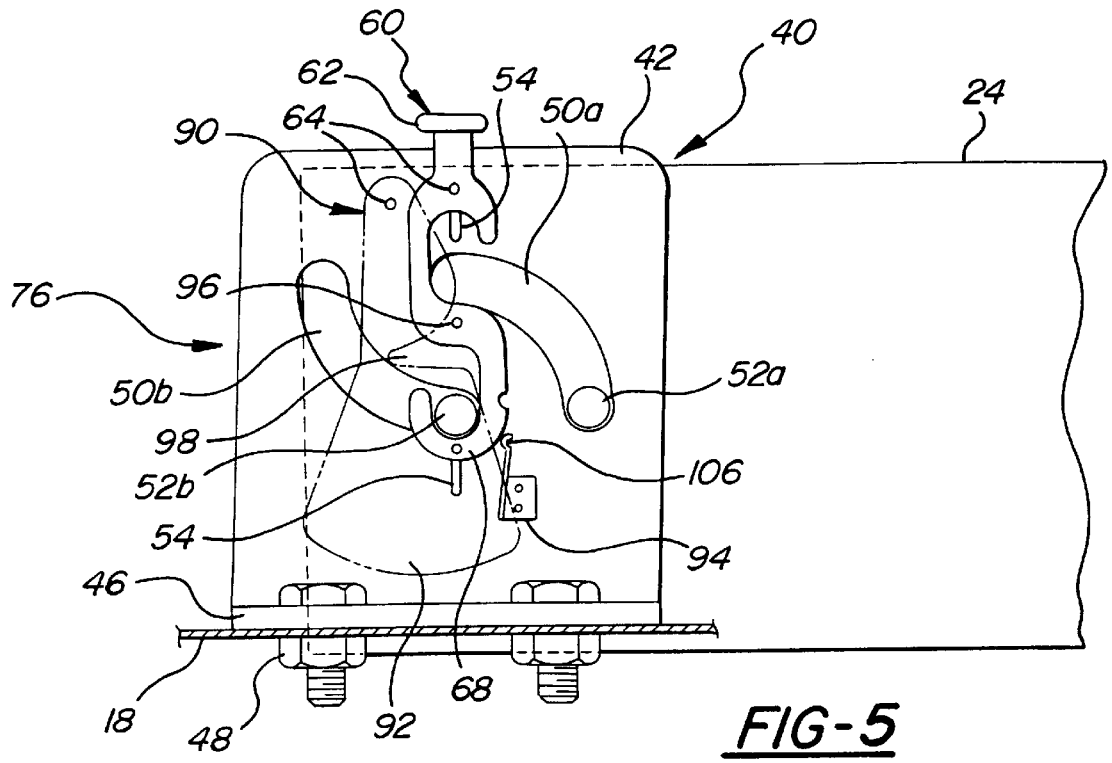
FIG. 5 is a view similar to FIG. 4 illustrating the pivoting mechanism for the folded center seat back in the load floor height position.
Figure 6:
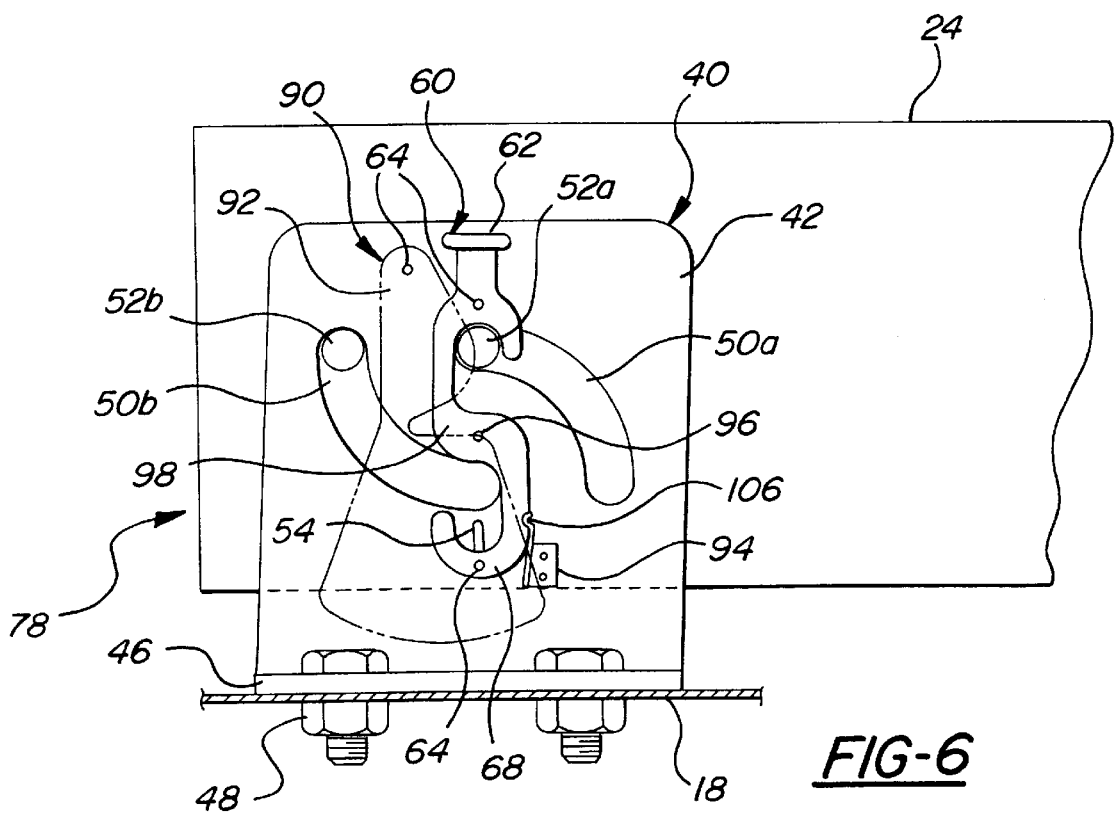
FIG. 6 is a sectional view taken along line 6—6 of FIG. 3 illustrating the pivoting mechanism for the folded center seat back in the ergonomic armrest height position.
Figure 7:
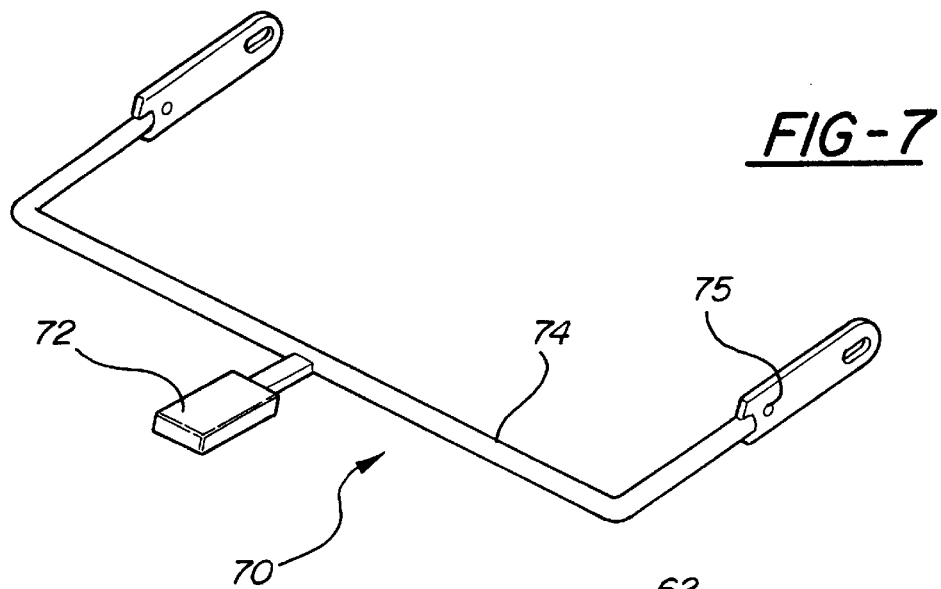
FIG. 7 is a perspective view of a height selector mechanism, according to the present invention, for the seat assembly of FIG. 1.
Figure 8:
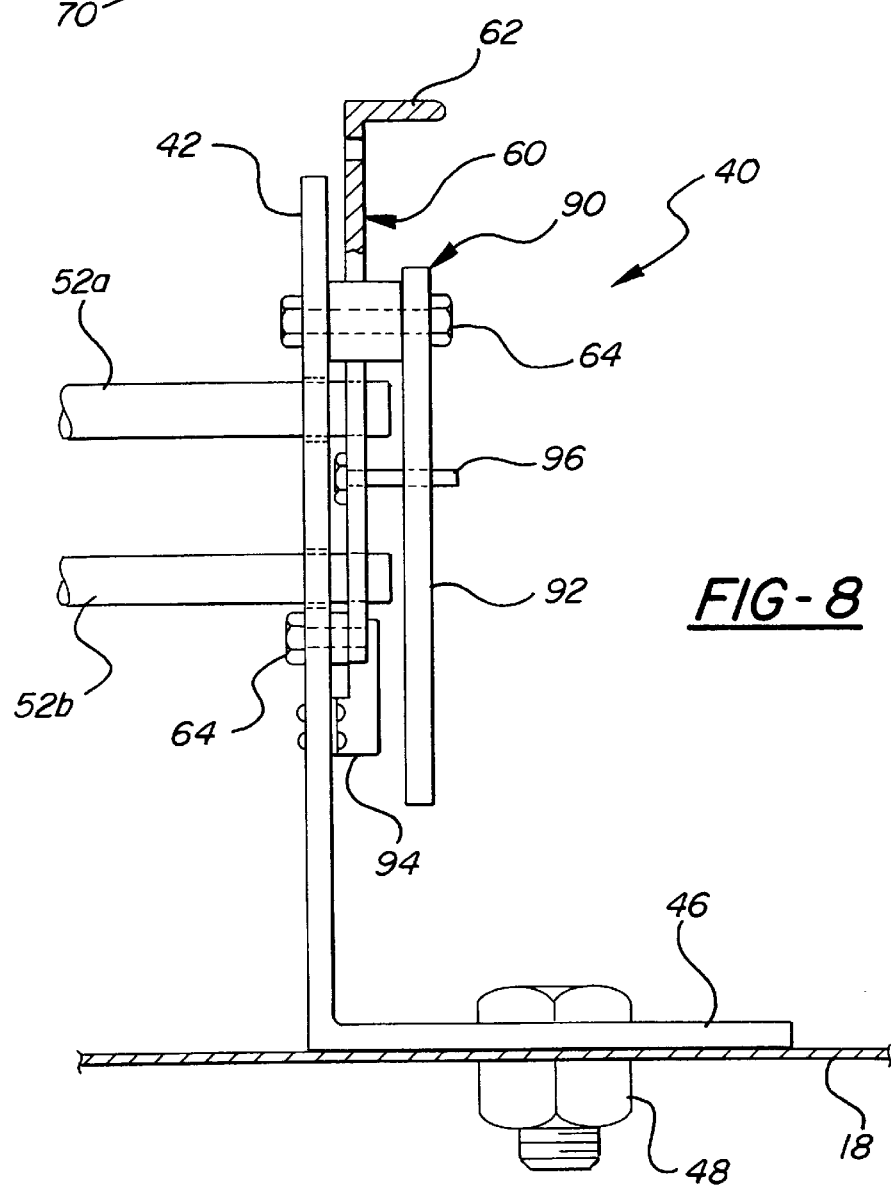
FIG. 8 is a fragmentary side view of a pivoting mechanism, according to the present invention, for the seat assembly of FIG. 1.

Referring to FIGS. 4 through 8, the pivoting mechanism 40 for the center seat back 24 is illustrated. In FIG. 4, the center seat back 24 is illustrated in an upright position. It should be appreciated that, in this example, there is a pair of interconnected pivoting mechanisms 40, each located on a lateral side of a lower end of the center seat back 24.

The pivoting mechanism 40 includes a mounting bracket 42 for securing the center seat back 24 to the vehicle structure 18. The mounting bracket 42 is generally planer, with a flange 46 extending transversely along a lower edge of the mounting bracket 42. Preferably, the flange 46 of the mounting bracket 42 is secured to the vehicle structure 18 by suitable means such as with a bolt 48.

The mounting bracket 42 provides a guide for a pair of pivot pins 52a and 52b, and a mounting surface for a pivot pin locking mechanism 60 and an inertial locking mechanism 90. The mounting bracket 42 guides the travel of the pivot pins 52a, 52b by providing an upper arcuate shaped channel 50a and a lower accurate shaped channel 50b. It should be appreciated that the shape and position of the channels 50a and 50b geometrically define a center pivot point and folded angular position of the center seat back 24 with respect to the seat portion 16. The mounting bracket 42 also includes a pair of vertically spaced elongated slots 54 for mounting the pivot pin locking mechanism 60. The mounting bracket 42 further includes an opening for mounting the inertial locking mechanism 90.

The pivoting mechanism 40 includes an upper pivot pin 52a and a lower pivot pin 52b. It should be appreciated that, in this example, the pivots pins 52a, 52b interconnect each pivoting mechanism 40, so that each pivoting mechanism 40 pivots about the same center pivot point. The upper pivot pin 52a extends therethrough the upper channel 50a in each mounting bracket 42. Likewise, the lower pivot pin 52b extends therethrough the lower channel 50b in each mounting bracket 42.

The pivot pin locking mechanism 60 locks in place either one of the upper or lower pivot pins 52a,52b, so that the unlocked pivot pin acts as the center pivot point and is free to travel within its respective channel 50a, 50b. Preferably, the pivot pin locking mechanism 60 is an S-shaped member having an upper hooking portion 66 and a lower hooking portion 68. Either one of the upper or lower hooking portions 66,68 hooks around either one of the upper or lower pivot pins 52a, 52b, respectively, to prevent it from moving in the channel 50a, 50b.

The pivot pin locking mechanism 60 is operably attached to a height selector mechanism 70 and the mounting bracket 42. Preferably, the pivot pin locking mechanism 60 has a flange 62 extending from the upper hooking portion 66 for attaching the pivot pin locking mechanism 60 to the height selector mechanism 70 by suitable means such as with a shoulder bolt 64.

The pivot pin locking mechanism 60 also includes an opening (not shown) corresponding to the elongated slots 54 in the mounting bracket 42 for securing the pivot pin locking mechanism 60 to the mounting bracket 42 using a suitable fastening mechanism. For example, another shoulder bolt 64 would allow the pivot pin locking mechanism 60 to travel within the elongated slots 54 in the mounting bracket 42.

The height selector mechanism 70 allows the outer seat occupant to select either a load floor height 76 or an ergonomic armrest height 78 for the center seat back 24 in a folded position. The height selector mechanism 70 includes a selector switch 72, and the position of the selector switch 72 corresponds to either one of the ergonomic armrest height 78 or the load floor height 76 of the center seat back 24 in a folded position. The selector switch 72 is fixedly attached to a connecting rod 74 that pivots radially to transfer the position of the selector switch 72 to the pivot pin locking mechanism 60. Preferably, the connecting rod 74 is fixedly attached to the flange 62 of the pivot pin locking mechanism 60, by suitable means such as a shoulder bolt 64. Also, the connecting rod 74 is hingedly supported, for example, to the cover portion 34 at 75.

In operation, an outer seat occupant can select the vertical height of the armrest 26 by setting a position of a height selector mechanism 70. By placing the height selector switch 70 in a down position, the pivot pin locking mechanism 60 is in an up position, raising the pivot pin locking mechanism 60 until it engages and locks the lower pivot pin 52b. As the operator folds down the center seat back 24, the upper pivot pin 52a is the center pivot point. The center seat back 24 pivots radially into position corresponding to the load floor height 76.

Conversely, by placing the height selector switch 70 in an up position, the pivot pin locking mechanism 60 is in a down position, thus lowering the pivot pin locking mechanism 60 until it engages and locks the upper pivot pin 52*a*. With the upper pivot pin 52*a* locked, The lower pivot pin 52*b* is the center pivot point. The center seat back 24 pivots radially into the position corresponding to the ergonomic armrest height 78.

The pivoting mechanism 40 also includes an inertial locking mechanism 90, well known in the art, for limiting the degree of forward travel of the center seat back 24 in the event of a sudden inertial force, such as that occurring when the motor vehicle 12 suddenly stops. In this example, the inertial locking mechanism 90 includes an inertial locking weight 92, an inertial locking spring 94 and an inertial stop 96.

The inertial locking weight 92 is generally planer with a triangular shape. One side of the inertial locking weight 92 is notched to form a catching portion 98. The inertial locking weight 92 is pivotally attached near an apex of the inertial locking weight 92, to the mounting bracket 42, by suitable means such as a shoulder bolt 64.

The inertial locking spring 94 has an L-shape. A lower portion of the inertial locking spring 94 is attached to the mounting bracket 42 using a suitable technique, such as riveting. An upper end of the inertial locking spring 94 forms a U-shaped locking portion 106. The height selector switch 70 includes a notched portion 108 near a lower end of the height selector switch 70, that is complimentary to the locking portion 106 of the inertial locking spring 94.

The inertial stop 96 is fixedly retained by the pivot pin locking mechanism 60 and extends perpendicular to the pivot pin locking mechanism 60. Preferably, the position of the inertial stop 96 is complimentary to the catching portion 98 of the inertial locking weight 92.

In operation, a sudden inertial force will cause the inertial locking weight 92 to pivot forward. The catching portion 98 of the inertial locking weight 92 catches the inertial stop 96, pushing it in a downwardly direction until the notched portion 108 of the pivot pin locking mechanism 60 is retained by the inertial locking spring 94. The upper pivot pin 52*a* is locked before the lower pivot pin 52*b* is released to prevent the armrest 26 from folding-out in case of a sudden movement, such as that occurring during a collision. The inertial locking mechanism 90 is overridden when the position of the height selector switch 70 is changed by the outer seat occupant.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat assembly with a center adjustable height armrest comprising:
    a generally horizontal seat portion;
    a generally upright back portion, said back portion having a pair of outer seat backs spaced transversely and a center seat back disposed between said outer seat backs aligned in a row, said center seat back having an upright position aligned with said outer seat backs and a folded down position at an angle to said outer seat backs;
    said folded center seat back providing an armrest having an adjustable height of either one of a load floor height and an ergonomic armrest height;
    a pivoting mechanism having an adjustable center point for pivotally connecting said center seat back to vehicle structure;
    an inertial locking mechanism operably connected to said pivoting mechanism for limiting a radial travel of said center seat back in response to a sudden inertial force; and
    a height selector mechanism operably connected to said pivoting mechanism for selecting either one of said load floor height and said ergonomic armrest height for said folded center seat back.

2. A seat assembly with a center adjustable height armrest comprising:
    a generally horizontal seat portion;
    a generally upright back portion, said back portion including a center seat back having an upright position and a folded down position;
    a pivoting mechanism including an upper pivot pin and a lower pivot pin for pivotally connecting said center seat back to vehicle structure; and
    said center seat back providing an armrest having an adjustable height of either one of a load floor height and an ergonomic armrest height corresponding to a selection of one of said upper pivot pin and said lower pivot pin as a center pivot point.

3. A seat assembly as set forth in claim 2, further including a height selector mechanism operably connected to said pivoting mechanism for selecting either one of said upper pivot pin and said lower pivot pin to effect said load floor height and said ergonomic armrest height for said center seat back.

4. A seat assembly as set forth in claim 2, wherein said generally upright back portion includes a pair of outer seat backs spaced transversely, said center seat back disposed between said outer seat backs and aligned in a row, said center seat back being aligned with said outer seat backs when in said upright position and at an angle to said outer seat backs when in said folded down position.

5. A seat assembly with an adjustable height armrest for a motor vehicle comprising:
    a generally horizontal seat portion;
    a generally upright back portion, said back portion having a pair of outer seat backs spaced transversely and a center seat back disposed between said outer seat backs aligned in a row, said center seat back having an upright position aligned with said outer seat backs and a folded down position at an angle to said outer seat backs;
    said folded center seat back providing an armrest having an adjustable height of either one of a load floor height and an ergonomic armrest height;
    a pivoting mechanism having an adjustable center pivot point for pivotally connecting said center seat back to vehicle structure of the motor vehicle; and
    a height selector mechanism operably connected to said pivoting mechanism for selecting either one of said load floor height and said ergonomic armrest height for said folded center seat back;
    said pivoting mechanism including an upper pivot pin, a lower pivot pin, a mounting bracket and a pivot pin locking mechanism, one of said upper pivot pin and said lower pivot pin being said center pivot point, said mounting bracket having an upper arcuate channel and a lower arcuate channel for guiding a travel of either one of said upper pivot pin in said upper arcuate channel and said lower pivot pin in said lower arcuate channel, said pivot pin locking mechanism operably connected to said height selector mechanism and to said mounting bracket for selecting said center pivot point by locking on either one of said upper pivot pin and said lower pivot pin depending on whether either one of said ergonomic armrest height and said load floor height is selected.

6. A seat assembly as set forth in claim 5 wherein said height selector mechanism has an up position that causes said pivot pin locking mechanism to lock said upper pivot pin so that said center seat back pivots radially about said lower pivot pin until said folded center seat back is in said ergonomic armrest height position.

7. A seat assembly as set forth in claim 5 wherein said height selector mechanism has a down position that causes said pivot pin locking mechanism to lock said lower pivot pin so that said center seat back pivots radially about said upper pivot pin until said folded center seat back is in said load floor height position.

8. A seat assembly as set forth in claim 5 including a pair of pivoting mechanisms positioned on either side of a lower end of said center seat back.

9. A seat assembly as set forth in claim 8 wherein said upper pivot pin and said lower pivot pin interconnect said pivoting mechanisms.

10. A seat assembly as set forth in claim 5 including an inertial locking mechanism operably connected to said pivoting mechanism for limiting a radial travel of said center seat back in response to a sudden inertial force.

11. A seat assembly as set forth in claim 10 wherein said inertial locking mechanism comprises:

an inertial locking weight pivotally connected to said pivoting mechanism, wherein said inertial locking weight includes a catching portion;

an inertial locking spring having a u-shaped locking portion at an upper end fixedly attached to said pivoting mechanism;

a notch in said height selector mechanism complimentary in shape to said locking portion of said inertial locking spring;

an inertial stop fixedly retained by said pivot pin locking mechanism and positioned complimentary to said catching portion of said inertial locking weight; and whereby an inertial force causing said inertial locking weight to pivot forward until said catching portion catches said inertial stop, pushing said inertial locking weight downwards until said notched portion is retained by said inertial locking spring and said upper pivot pin and said lower pivot pin are simultaneously locked by said pivot pin locking mechanism.

12. A seat assembly with an adjustable height armrest for a motor vehicle comprising:

a generally horizontal seat portion;

a generally upright back portion, said back portion having a pair of outer seat backs spaced transversely and a center seat back disposed between said outer seat backs aligned in a row, said center seat back having an upright position aligned with said outer seat backs and a folded down position at an angle to said outer seat backs;

said folded center seat back having an adjustable armrest height of either one of a load floor height and an ergonomic armrest height;

a pivoting mechanism having an adjustable center pivot point for pivotally connecting said center seat back to vehicle structure of the motor vehicle;

said pivoting mechanism including an upper pivot pin and a lower pivot pin, a mounting bracket having an upper arcuate channel and a lower arcuate channel for guiding the travel of either one of said upper pivot pin in said upper arcuate channel and said lower pivot pin in said lower arcuate channel and a pivot pin locking mechanism operably connected to a height selector mechanism and to said mounting bracket for selecting said center pivot point by locking on either one of said upper pivot pin and said lower pivot pin, depending on whether either one of said ergonomic armrest height and said load floor height is selected; and a height selector mechanism operably connected to said pivoting mechanism for selecting either one of said load floor height and said ergonomic armrest height of said folded center seat back, wherein placing said height selector mechanism in a down position causes said pivot pin locking mechanism to lock said lower pivot pin so that said center seat back pivots radially about said upper pivot pin until said folded center seat back is in said load floor height position and placing said height selector mechanism in an up position causes said pivot pin locking mechanism to lock said upper pivot pin so that the center seat back pivots radially about said lower pivot pin until said folded center seat back is in said ergonomic armrest height position.

13. A seat assembly as set forth in claim 12 including a pair of pivoting mechanisms positioned on either side of a lower end of said center seat back.

14. A seat assembly as set forth in claim 13 wherein said upper pivot pin and said lower pivot pin interconnect said pivoting mechanisms.

15. A seat assembly as set forth in claim 12 including an inertial locking mechanism operably connected to said pivoting mechanism for limiting a radial travel of said center seat back in response to a sudden inertial force.

16. A seat assembly as set forth in claim 15 wherein said inertial locking mechanism comprises:

an inertial locking weight pivotally connected to said pivoting mechanism, wherein said inertial locking weight includes a catching portion;

an inertial locking spring having a u-shaped locking portion at an upper end, fixedly attached to said pivoting mechanism;

a notch in said height selector mechanism complimentary in shape to said locking portion of said inertial locking spring;

an inertial stop fixedly retained by said pivot pin locking mechanism and positioned complimentary to said catching portion of said inertial locking weight; and whereby an inertial force causing said inertial locking weight to pivot forward until said catching portion catches said inertial stop, pushing said inertial locking weight downwards until said notched portion is retained by said inertial locking spring and said upper pivot pin and said lower pivot pin are simultaneously locked by said pivot pin locking mechanism.

* * * * *